United States Patent [19]

Ryan, III et al.

[11] Patent Number: 4,873,947
[45] Date of Patent: Oct. 17, 1989

[54] VARIABLE COMPRESSION RATIO DIRECT INJECTION ENGINE

[75] Inventors: Thomas W. Ryan, III; Milan J. Maymar; Orin M. Anderson, all of San Antonio, Tex.

[73] Assignee: Southwest Research Institute, San Antonio, Tex.

[21] Appl. No.: 158,317

[22] Filed: Feb. 22, 1988

[51] Int. Cl.$^4$ .............................................. F02B 75/04
[52] U.S. Cl. .................. 123/78 C; 123/90.31; 123/188 M
[58] Field of Search ................ 123/48 R, 48 C, 78 R, 123/78 C, 41.82 A, 90.31, 193 C, 193 CH, 188 M, 435, 668, 669

[56] References Cited

U.S. PATENT DOCUMENTS

| | | | |
|---|---|---|---|
| 651,966 | 6/1900 | Fleury | 123/78 C |
| 1,280,058 | 9/1918 | Martin | 123/78 C |
| 1,360,366 | 11/1920 | Charter | 123/48 C |
| 1,429,164 | 9/1922 | Ramsey | 123/48 C |
| 1,532,788 | 4/1925 | Vandervell | 123/78 C |
| 1,665,607 | 4/1928 | Sargent | 123/78 C |
| 1,936,785 | 11/1933 | Filliol | 123/48 C |
| 2,592,829 | 4/1952 | Skinner | 123/48 AA |
| 2,910,973 | 11/1959 | Witzky | 123/48 B |
| 3,115,127 | 12/1963 | Spencer et al. | 123/669 X |
| 4,144,851 | 3/1979 | Prosen | 123/78 C |
| 4,148,284 | 4/1979 | Prosen | 123/78 C |
| 4,449,489 | 5/1984 | Williams | 123/48 R |
| 4,469,055 | 9/1984 | Caswell | 123/78 B |
| 4,574,751 | 3/1986 | Sugiyama et al. | 123/188 M |
| 4,704,999 | 11/1987 | Hashikawa et al. | 123/435 |

OTHER PUBLICATIONS

Thomas W. Ryan, III, "Correlation of Physical and Chemical Ignition Delay to Cetane Number" pp. 2-3, Oct. 21-24, 1985, Tulsa, Okla.

*Primary Examiner*—Willis R. Wolfe
*Attorney, Agent, or Firm*—Richard J. Smith

[57] ABSTRACT

A variable compression ratio, direct injection engine. A rotatable collar in operative engagement with a cylinder liner holder assembly is utilized to raise and lower the cylinder liner relative to the crankshaft, thereby varying the compression ratio. A double chain drive mechanism maintains a constant valve timing relationship as the cylinder liner is raised and lowered. The head assembly is provided with a removable fire deck and a tapered intake port.

11 Claims, 5 Drawing Sheets

VARIABLE COMPRESSION RATIO DIRECT INJECTION ENGINE

FIELD OF THE INVENTION

The present invention relates generally to internal combustion engines. More specifically, the present invention relates to an internal combustion engine having a compression ratio which can be changed during operation of the engine. compression ratio which can be changed during operation of the engine.

BACKGROUND

In the early 1930's it was proposed that the quality of a fuel be based on a comparison of its ignition delay time in a diesel engine to that of a blend of two reference fuels. The resulting development was the "cetane scale" in which a fuel was assigned a "cetane number.". The reference fuels used were cetane, $C_{16}H_{32}$, and mesitylene, $C_9H_{12}$, with cetane numbers of 100 and 0, respectively. These particular fuels were chosen because cetane burned readily in a normal engine, while mesitylene did not burn at all. In 1935 the ASTM adopted this form of diesel rating system using cetane, $C_{16}H_{34}$, and alphamethylnaphthalene, $C_{11}H_{10}$, as the reference fuels. The former was assigned a cetane number of 100, while the latter was given a cetane number of 0. In 1962 the ASTM added heptamethylnonane, $C_{16}H_{34}$, to the cetane sprocket as an intermediate, low-ignition-quality fuel with a cetane number of 15.

The currently used cetane rating procedure has a number of shortcomings. One of the basic problems with the cetane procedure is that neither the engine nor the test conditions are representative of current engine design or typical operating condition.

A major criticism of the CFR engine test for measuring the cetane number of a fuel sample has been the poor repeatability and reproducibility of the results. The current procedure involves the use of a Waukesha CFR engine equipped with a cylindrical prechamber. The prechamber has a movable end plate which is used to change the volume of the prechamber and thus the compression ratio. The specified operating conditions of the test are equivalent to a high-speed idle test, with the speed set at 900 rpm and fuel flow set at 13 ml/min (equivalent to an air-fuel ratio of approximately 30).

In summary, the basic problems associated with the current ASTM cetane rating procedure are that neither the engine nor the test conditions are representative of modern practice. In addition to this basic problem, there are several more practical problems with the current system. These can be summarized as follows: (1) Cetane number does not correlate directly with engine startability in modern engine designs; (2) The standard deviation of the measurement is high (0.7 CN) in a given laboratory, and laboratory-to-laboratory variations can be as high as 4 to 6 CN; (3) The cetane number does not provided an accurate measure of ignition quality of fuels in which the ignition delay dependence on temperature and type of ignition (single-stage or two-stage) differ from the reference fuels; i.e., the procedure is realistically limited to petroleum diesel fuels; (4) The time and cost factors associated with the current procedure (ASTMD 613) are prohibitive.

Clearly a new approach to rating ignition quality should address the underlying problems of adequate representation of modern practice, in addition to the other problems listed above. If an engine-based technique is employed, the rating techniques must be performed in an engine configuration and at test conditions representative of current practice. Ideally the test engine should incorporate direct-injection and be capable of speeds up to 2500 rpm to be representative of the current design of heavy-duty engines. Features which are deemed to be important in the performance of the evaluation are variable compression ratio, accurate control of inlet air and coolant temperatures, and accurate control of fuel flow rates. An engine capable of meeting the above discussed criteria has heretofore been lacking in the prior art.

SUMMARY OF THE INVENTION

The present invention provides a direct injection, compression ignition engine in which the compression ratio may be varied while the engine is operating. This variation can be accomplished in accurate, repeatable steps and, furthermore, can be accomplished without altering the timing of the valves. The variation in the compression ratio can be controlled either manually or electronically. The features provided by the engine of the present invention are especially useful for the testing and rating of fuels.

The compression ignition engine of the present invention comprises a crankcase assembly, counterbalance case and flywheel, a piston assembly, a valve assembly, a cam shaft, and a cylinder liner which are further provided with apparatus for raising and lowering the cylinder liner relative to the crankshaft and apparatus for maintaining a constant valve timing relationship as the cylinder liner is raised and lowered. The engine of the present invention is further provided with a head assembly having a removable fire deck, a fuel injector bore adapted to permit direct or indirect fuel injection, a pressure transducer passage, and a tapered intake port.

The apparatus for raising and lowering the cylinder liner relative to the crankshaft comprises a chain driven, rotatable collar in operative engagement with a cylinder liner holder assembly. The rotatable collar is in threaded engagement with a flange secured to the crankcase and engaged with the holder assembly by means of a split ring received within a groove in the collar and a groove in the holder assembly. Rotation of the collar imparts vertical movement to the holder assembly, cylinder liner, and head assembly.

The apparatus for maintaining a constant valve timing relationship comprises a pair of timing chains, each of which are engaged with a double sprocket member mounted on a pivot shaft. One of the timing chains is engaged with a gear sprocket in operative engagement with the crankshaft and the other timing chain is engaged with a gear sprocket in operative engagement with the camshaft.

DETAILED DESCRIPTION OF THE PREFERRED EMBODIMENT

Figure 1:
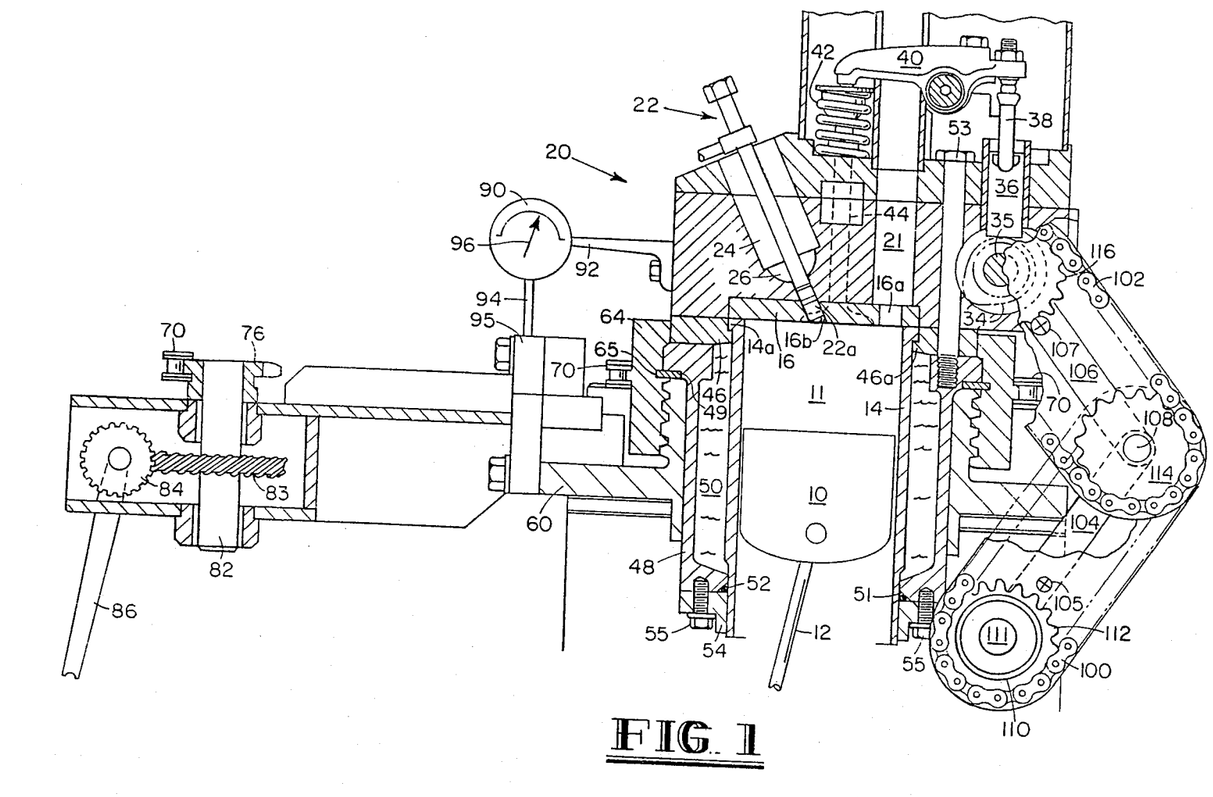
FIG. 1 is a cross-sectional side view of the upper portion of the preferred embodiment of the variable compression ratio, direct injection engine of the present invention taken through the center of the engine.

Referring to the drawings in more detail, and to FIG. 1 in particular, the upper portion of the preferred embodiment of the variable compression ratio direct injection engine of the present invention is shown in cross-section. As will be discussed in greater detail below, the preferred embodiment of the present invention comprises a head assembly including an overhead cam, and a cylinder liner and cylinder carrier or cylinder liner holder assembly which move with the head assembly to allow the compression ratio of the system to be varied.

Figure 1A:
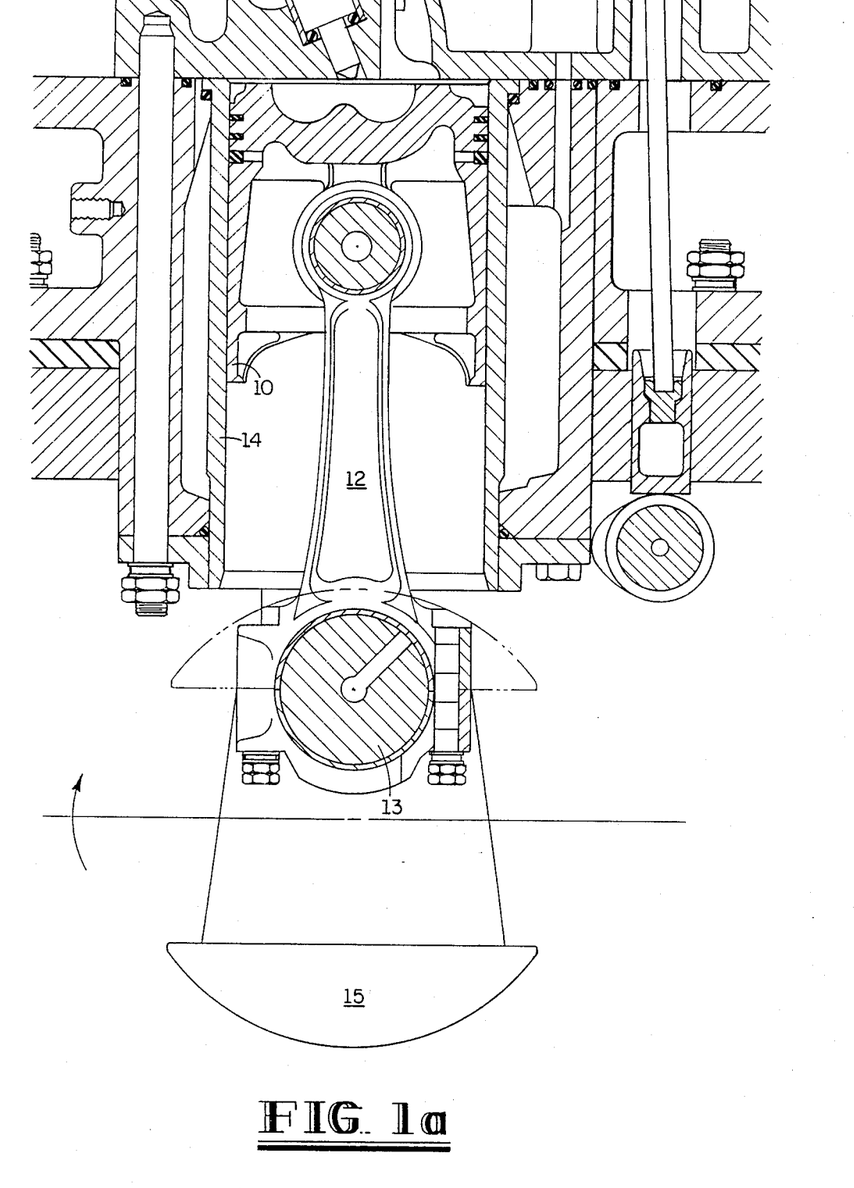
FIG. 1a is a cross-sectional side view of the lower portion of the crankcase assembly employed in the variable compression ratio, direct injection engine of the present invention.
Figure 1B:
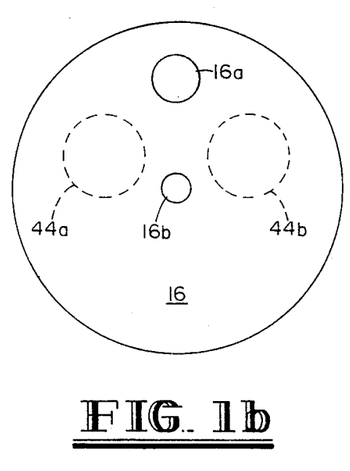
FIG. 1b is a top plan view of the fire deck used in the combustion chamber of the variable compression ratio, direct injection engine of the present invention.

Referring to FIG. 1, a piston assembly comprising a piston 10 and a piston rod or connecting rod 12 are received in a cylinder liner or sleeve 14 and move in cooperation with a crankshaft (not shown in FIG. 1) in a conventional manner to define a vertical reciprocating compression stroke. The novel features of the preferred embodiment of the present invention can be incorporated into a standard crankcase assembly, such as the Standard Laboratory Equipment Company CLR engine. That is, the engine of the present invention may incorporate the crankcase, the crankshaft, the counterbalance case and flywheel, the connecting rod and piston assembly, the cylinder liner, and the cam shaft from the CLR engine. FIG. 1a is a cross-sectional view of a standard crankshaft assembly, such as that provided in the CLR engine, comprising a crankshaft 13 and a counterbalance 15. Referring again to FIG. 1, a combustion chamber 11 is defined by the upper face of the piston 10, the inner face of cylinder sleeve 14 and the lower face of a removable fire deck 16. The fire deck 16 is received in a head assembly 20, described in greater detail below, which houses a valve assembly capable of maintaining constant valve timing as the head assembly is moved to change the compression ratio of the engine. In one embodiment of the invention, the fire deck 16 comprises a removable steel plate that contains the valve seats, a first threaded port 16a for receiving a water cooled pressure transducer, and a second threaded port 16b for receiving a fuel injector nozzle, discussed in greater detail below. A head passage 21 is aligned with port 16a to permit insertion of the pressure transducer into chamber 11. The removable fire deck 16 offers the advantage of allowing the engine of the present invention to be used to test the heat characteristics of various materials. In an alternate embodiment of the invention, the fire wall 16 can be formed from high temperature ceramic coated materials or from monolithic ceramic materials. FIG. 1b is a plan view of the fire deck 16 illustrating the relative placement of first and second threaded ports 16a and 16b, respectively.

Figure 2:
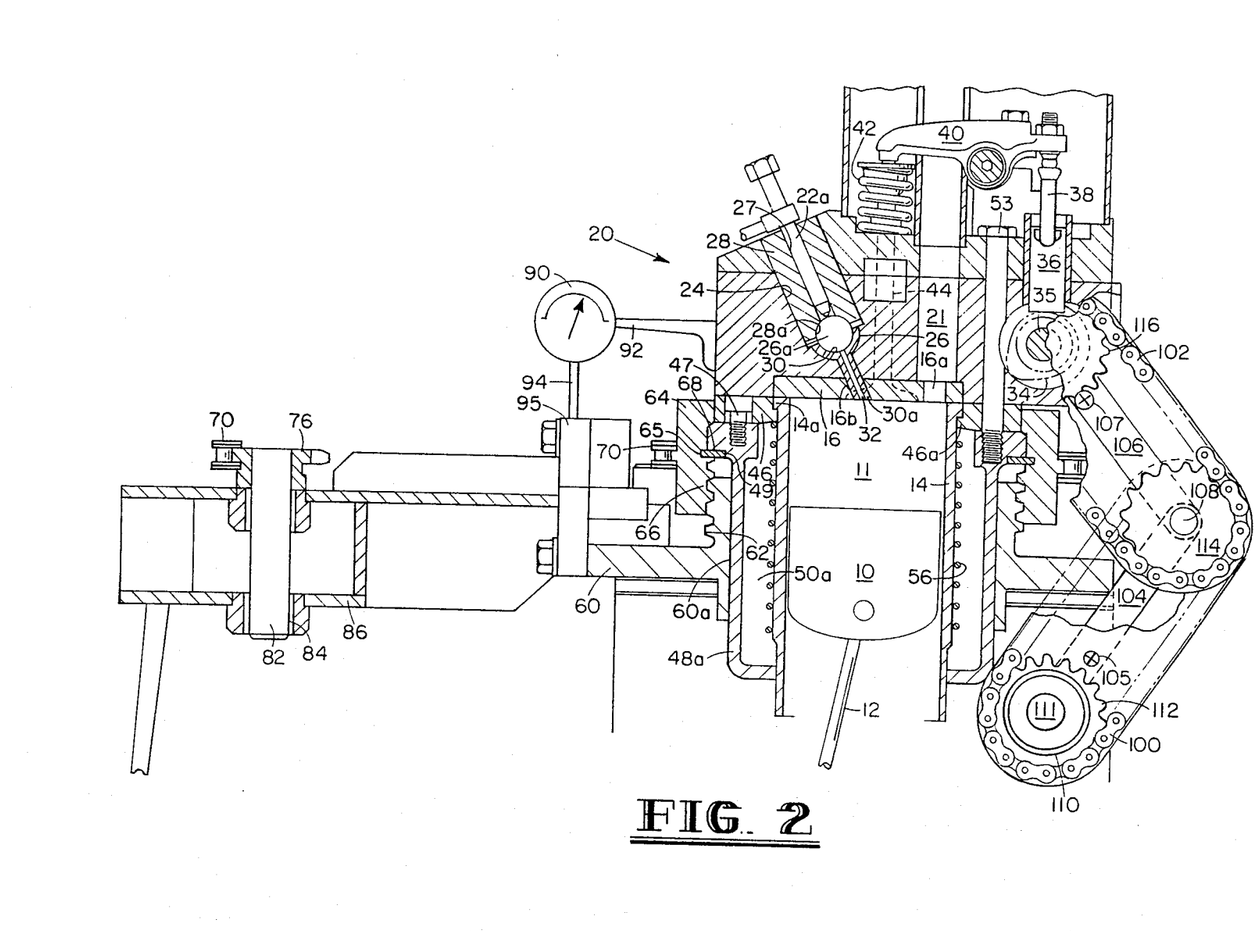
FIG. 2 is a cross-sectional side view of an alternate embodiment of the upper portion of the variable compression ratio, direct injection engine of the present invention taken through the center of the engine.

Referring again to FIG. 1, fuel is injected into the combustion chamber by a fuel injector 22 having a nozzle 22a which is adapted to be received in the threaded port 16b of fire deck 16. The injector 22 is centered in bore 24 in the head assembly 20. In the embodiment of the engine shown in FIG. 1, the injector 22 is received in a hollow bore 24 which terminates in a lower hemispherical depression 26. In this embodiment there is no communication of fuel from the injector 22 to either the bore 24 or to the hemispherical chamber 26. However, in an alternate embodiment of the invention, shown in FIG. 2, a shorter fuel injector 22a is used and the void defined by hemispherical depression 26 forms a precombustion chamber which is illustrated by reference numeral 26a. In the alternate embodiment illustrated in FIG. 2, the injector 22a is inserted into a longitudinal bore 27 in a generally tubular liner 28 which is received in the bore 24. The hemispherical depression 26 is provided with a generally cup-shaped liner 30 having a downwardly directed neck 30a with a longitudinal bore 32 which defines a path for the flow of fuel from the precombustion chamber 26a into the main combustion chamber 11 of the engine. As can be seen in FIG. 2, the lower end of the tubular line 28 is provided with a hemispherical depression 28a. The hemispherical depression 28a mates with the upper portion of the cup shaped liner 30 to give the precombustion chamber 26a generally spherical shape which provides maximum combustion efficiency.

As was discussed previously, the preferred embodiment of the invention comprises a number of conventional components. For example, the head assembly 20 includes a conventional valve assembly comprising components for controlling intake valve 44a and exhaust valve 44b, illustrated in FIG. 3. The respective components for operating these valves are illustrated generally in FIGS. 1 and 2 by a cam 34 and associated camshaft 35, lifter 36, push rod 38 and rocker arm 40. The pair of valves (illustrated generally by the single valve 44 shown in phantom in FIG. 1 and FIG. 2) are normally biased to the closed position by spring 42. The above mentioned valve assembly components cooperate to define a four stroke compression cycle.

The preferred embodiment of the invention comprises a single cyclinder provided with a single intake valve 44a and a single exhaust valve 44b. The intake valve 44a and the exhaust valve 44b are illustrated generally in FIG. 3 with associated rocker arms 40a and 40b, respectively. Although the valve assembly is adapted to operate in a conventional timing sequence for a four stroke compression cycle, the invention comprises novel means for maintaining constant valve timing as the head assembly is raised and lowered to change the compression ratio of the engine. The details of the constant valve timing system will be discussed in greater detail below.

Figure 4:
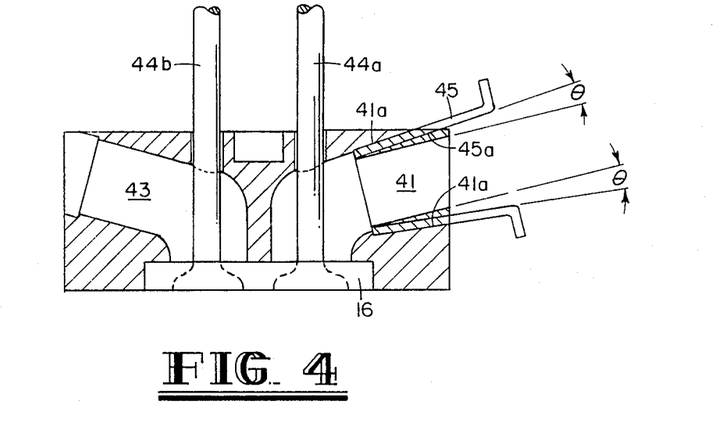
FIG. 4 is a cross-sectional view, taken along section lines 4—4 of FIG. 3, illustrating details relating to the intake and exhaust ports of the preferred embodiment of the variable compression ratio, direct injection engine of the present invention.

Details relating to the intake port 41 and exhaust port 43 of the invention engine are illustrated in FIG. 4. The inner surface 41a of intake port 41 is tapered to allow the intake port 41 to accommodate a variety of variable geometry venturi port inserts 45. The port 41 defined by the inner surface 45a of the insert 45 can have a geometry varying from an essentially straight intake path to one having a taper of an angle $\theta$, as illustrated in FIG. 4. In the preferred embodiment, $\theta$ is approximately 5 degrees. The geometry of the inner surfaces of inserts 45 dictates the amount of swirling of the gas stream passing into the combustion chamber 11 through the port 41. A relatively straight insert geometry will provide little or no swirling, while a tapered insert geometry will provide a comparatively high degree of swirling. The degree of swirling can be further enhanced by providing a plurality of helical etchings (not shown) in the inner surface 45a of the port insert 45. Accordingly, the tapered intake port 41 is adapted to receive a variety of removable intake port inserts 45, thereby permitting variation in the intake port geometry by varying the insert.

Referring again to FIG. 1, it can be seen that the upper end of the cylinder liner 14 is provided with an outwardly protruding lip 14a. This lip is supported by a shoulder 46a of an annular collar 46 which is received in surrounding relationship to the upper end of the sleeve 14. A generally tubular cylinder jacket 48 is disposed in surrounding relation to the cylinder sleeve 14 with the upper end of the jacket 48 being sealed with the lower face of the annular collar 46 by a plurality of bolts 47, illustrated generally in FIG. 2. The cylinder liner holder assembly is secured to the head assembly by a plurality of bolts. With the jacket 48 attached in the manner shown in FIG. 1, an annular chamber 50 is defined around the outer surface of the cylinder liner 14. In the embodiment of FIG. 1, the chamber 50 is filled with water. The lower end of the jacket 48 is provided with an annular groove 51 to receive an 0-Ring 52 to ensure a water-tight seal for the chamber 50. The 0-Ring 52 is retained in the groove by a lower annular collar 54 which is secured to jacket 48 by a plurality of bolts 55. Collar 46, jacket 48, collar 54, 0-ring 52, and bolts 47 and 55 define a cylinder liner holder assembly which is connected to the head assembly 20 by a plurality of head bolts 53. In an alternate embodiment, shown in FIG. 2, a modified cylinder jacket 48a is secured to the cylinder liner 14 to define an annular chamber 50a which is filled with air. In this embodiment of the engine, a plurality of heating coils 56 are wrapped around the outer face of the cylinder liner 14 to allow the cylinder liner 14 to be heated to simulate various operating temperature environments. Collar 46, jacket 48a, and bolts 47 define an alternate embodiment of a cylinder liner holder assembly which is connected to the head assembly 20 by a plurality of head bolts 53.

Referring again to FIGS. 1 and 2, the apparatus for raising and lowering the head assembly 20 will be described in greater detail. A mounting flange 60 is secured to the crankcase in a conventional manner, such as with a plurality of bolts. The mounting flange 60 has a vertical 60a which is provided with a plurality of external or outwardly directed threads 62. An outer collar 64 is secured in surrounding relation to the vertical portion of the flange 60, and is provided with a plurality of internal or inwardly directed threads 66 which are adapted to mate in threaded engagement with threads 62 to cause the head assembly 20 to be raised or lowered as collar 64 is rotated. A split ring 68 is received in a groove 65 in the annular collar 64 and a groove 49 in jacket 48, as shown in FIGS. 1 and 2. The split ring 68 serves to engage the collar 64 with jacket 48 or 48a to thereby effectuate vertical movement of the cylinder liner 14 upon rotation of the collar 64 as described hereinbelow.

Figure 3:
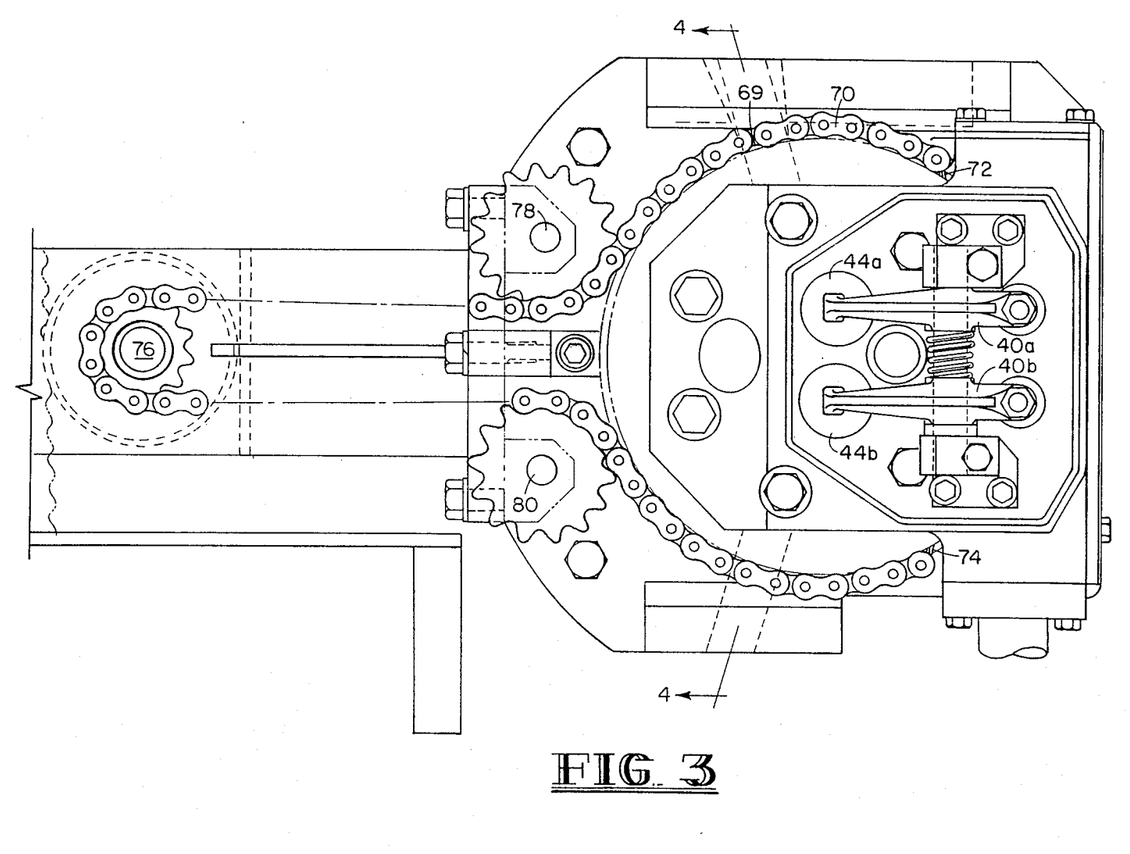
FIG. 3 is a top plan view of the preferred embodiment of the variable compression ratio, direct injection engine of the present invention illustrating details relating to the chain driven actuator for changing the compression ratio of the combustion chamber.

Referring to FIG. 3, the operation of the elevating assembly will be described in further detail. The outer face of the collar 64 is provided with a plurality of gear teeth 69 which are adapted to engage a chain 70, with the chain 70 being anchored to the annular collar 64 at points 72 and 74, as indicated in FIG. 3. Movement of the chain 70 is controlled by a chain sprocket 76. The chain 70 is directed around first and second idler sprockets 78 and 80, respectively, to maintain the chain 70 in contact with the gear teeth 69 on the outer surface of collar 64.

Referring again to FIGS. 1 and 2, it can be seen that the control sprocket 76 is journaled for rotation on a vertical shaft 82. The control sprocket 76 can be actuated by a manual means such as a hand crank 86, or by an appropriate servo motor (not shown). As can be seen in the top plan view of FIG. 3, the annular collar 64 is rotated through a comparatively small angle to achieve the desired variation in the compression ratio of the invention engine. In general, the desired compression ratio changes can be achieved by rotating the annular collar 64 by a maximum angle of approximately 160 degrees in either the clokwise or the counterclockwise direction. Rotation of the collar 64 and the related movement of the head assembly 20 causes compression ratio to vary from 10 to 25. Rotational movement of the control sprocket 76 can be effected by applying a rotational force, such as by crank 86, to the worm gear assembly comprising gears 83 and 84, shown in FIGS. 1 and 2, with the worm gear assembly being appropriately engaged with shaft 82.

Operation of the apparatus for raising and lowering the head assembly 20 can be seen by referring again to FIGS. 1-3. As the handle 86 is rotated, gears 84 and 83 cause the control sprocket 76 to move the chain 70 in either a clockwise or counterclockwise direction. Movement of the chain 70 causes rotation of the collar 64 and movement of collar 64 in either an upward or downward direction, relative to the fixed crankcase, thus raising or lowering the head assembly 20, cylinder liner holder assembly, and cylinder liner 14 relative to the crankcase and crankshaft. That is, as collar 64 is rotated, collar 64 will push upwards or downwards on ring 68, thereby raising or lowering the cylinder liner holder assembly. Since the head assembly 20 is connected to the cylinder liner holder assembly and the cylinder liner 14 is supported by the cylinder liner holder assembly, the head assembly 20 and cylinder liner 14 will also move upward or downward as the cylinder liner holder assembly moves upward or downward. However, rotational movement of the cylinder liner holder assembly, head assembly 20, and cylinder liner 14 is prohibited by means of a first keyway in the jacket 48 or 48a, a second keyway in flange 60, and a key member inserted within the first and second keyways. The first and second keyways are in matching alignment substantially parallel to the vertical axis of cylinder liner 14. In the cross-sectional side view of FIG. 2, the collar 64 shown in a slightly elevated position relative to the position shown in FIG. 1, thus illustrating movement of the head assembly 20.

Referring again to FIG. 1 and FIG. 2, the relative position of the head assembly 20 can be indicated by a dial indicator 90 which is secured to the head assembly 20 by an arm 92. A spring loaded stylus 94 is in contact with the stationary portion of the mounting platform 95 and provides an indication of relative position of the head assembly 20 which can be read by way of a needle indicator 96 on a calibrated scale. The dial indicator 90 provides a direct indication of head assembly position which can be used to obtain an indirect indication of the compression ratio. In general, such a dial indicator 90 is calibrated in units of change in compression ratio per one thousandths of an inch.

Figure 5:
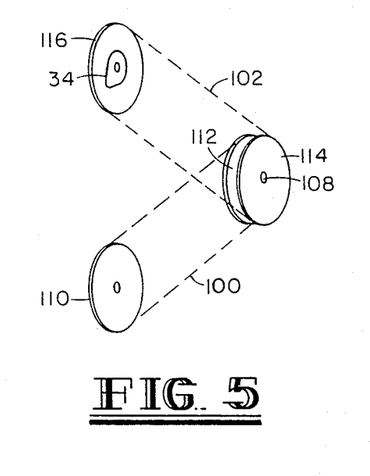
FIG. 5 is a perspective view of the chain sprocket assembly for maintaining constant valve timing in the preferred embodiment of the variable compression ratio, direct injection engine of the present invention.

As was discussed above, the variable compression ratio, direct injection engine of the present invention provides apparatus for maintaining constant valve timing as the head assembly 20 is raised or lowered to change the compression ratio. Referring to FIG. 1 and FIG. 5, it can be seen that rotation of the cam shaft 35 is controlled by a first cam timing chain 100 and a second cam timing chain 102. The relative position of timing chains 100 and 102 is maintained in a constant relation by first and second pivoting mounting brackets or arms 104 and 106, respectively, which are hingedly secured to a pivot shaft 108. The lower end of arm 104 is pivotally connected to the crankcase, as indicated at 105, and the upper end of arm 106 is pivotally connected to head assembly 20, as indicated at 107. Movement of the first valve timing chain 100 is controlled by a gear sprocket 110 mounted on a "dummy" cam shaft 111 which rotates in a conventionally timed relationship with the crankshaft 13. Chain 100 is engaged with sprocket 110 and an idler sprocket 112. Rotation of the gear sprocket 110 causes rotation of chain 100 which, in turn, causes rotation of an idler sprocket 112, which, in turn, causes rotation of a second idler sprocket 114. Idler sprockets 112 and 114 are preferably a double sprocket member having a center passage therethrough within which to receive pivot shaft 108. Movement of the second valve timing chain 102 is controlled by movement of the idler sprocket 114 shown in the perspective view of FIG. 5, which, in turn, causes rotation of a cam timing gear sprocket 116 which is mounted on cam shaft 35 and directly coupled to the cam 34. Chain 102 is engaged with sprocket 114 and sprocket 116. Shaft 108 is preferably a shoulder bolt which extends through a passage in each of the arms 104 and 106 and the center passage in the double sprocket member.

As the head assembly 20 is elevated or lowered, the above described valve timing apparatus will maintain a constant timing relationship for the valve train. For example, when the head assembly 20 is raised the shaft 108 will move toward the engine, but the valve timing will remain unchanged. Conversely, when the head assembly 20 is lowered the shaft 108 will move away from the crankshaft assembly while still maintaining appropriate timing for the valve train.

Although the variable compression ratio, direct injection engine of the present invention has been described in connection with the preferred embodiment, it is not intended to be limited to the specific forms set forth herein. On the contrary, it is intended to cover such alternatives, modifications, and equivalents as can be reasonably included within the spirit and scope of the invention as defined by the appended claims.

I claim:

1. A compression ignition engine, said engine having a crankcase, crankshaft, a counterbalance case and flywheel, a connecting rod and piston assembly, a cylinder liner, and a cam shaft, comprising:
  a holder for supporting said cylinder liner;
  a head assembly connected to said holder, said head assembly including valve means;
  means for alternately raising or lowering said cylinder liner relative to said crankshaft, thereby varying the compression ratio of said engine; and
  means for maintaining a substantially constant valve timing relationship as said cylinder liner is raised or lowered, said means for maintaining a substantially constant valve timing relationship comprising a timing shaft and a hinged linkage mechanism in operative engagement with said timing shaft and said cam shaft.

2. A compression ignition engine, said engine having a crankcase, crankshaft, a counterbalance case and flywheel, a connecting rod and piston assembly, a cylinder liner, and a cam shaft, comprising:
  a holder for supporting said cylinder liner;
  a head assembly connected to said holder, said head assembly including valve means;
  means for alternately raising or lowering said cylinder liner relative to said crankshaft, thereby varying the compression ratio of said engine, wherein said means for alternately raising or lowering said cylinder liner comprises a threaded flange connected to said crankcase, a collar adapted for threaded engagement with said flange, a ring adapted to be received within a groove in said collar and a groove in said holder, and means for rotating said collar, whereby said head assembly, holder, and cylinder liner are urged upward or downward upon rotation of said collar; and
  means for maintaining a substantially constant valve timing relationship as said cylinder liner is raised or lowered.

3. A compression ignition engine, said engine having a crankcase, crankshaft, a counterbalance case and flywheel, a connecting rod and piston assembly, a cylinder liner, and a cam shaft, comprising:
  a holder for supporting said cylinder liner;
  a head assembly connected to said holder, said head assembly including valve means;
  means for alternately raising or lowering said cylinder liner relative to said crankshaft, thereby varying the compression ratio of said engine, wherein said means for alternately raising or lowering said cylinder liner comprises a threaded flange connected to said crankcase, a collar adapted for threaded engagement with said flange, a ring adapted to be received within a groove in said collar and a groove in said holder, and means for rotating said collar, whereby said head assembly, holder, and cylinder liner are urged upward or downward upon rotation of said collar, wherein said means for rotating said collar comprises sprocket chain drive means and a roller chain connected to said collar and engaged with said sprocket chain drive means; and
  means for maintaining a substantially constant valve timing relationship as said cylinder liner is raised or lowered.

4. A compression ignition engine, said engine having a crankcase, crankshaft, a counterbalance case and flywheel, a connecting rod and piston assembly, a cylinder liner, and a cam shaft, comprising:
  a holder for supporting said cylinder liner;
  a head assembly connected to said holder, said head assembly including valve means;
  means for alternately raising or lowering said cylinder liner relative to said crankshaft, thereby varying the compression ratio of said engine; and
  means for maintaining a substantially constant valve timing relationship as said cylinder liner is raised or lowered, wherein said means for maintaining a substantially constant valve timing relationship comprises a first cam sprocket connected to a timing shaft, a first intermediate sprocket, a first roller chain engaged with said first cam sprocket and said first intermediate sprocket, a second intermediate sprocket engaged with said first intermediate sprocket, a second cam sprocket connected to said cam shaft, and a second roller chain engaged with said second intermediate sprocket and said second cam sprocket.

5. A compression ignition engine, said engine having a crankcase, crankshaft, a counterbalance case and flywheel, a connecting rod and piston assembly, a cylinder liner, and a cam shaft, comprising:
 a holder for supporting said cylinder liner;
 a head assembly connected to said holder, said head assembly including valve means, wherein said head assembly has a tapered intake port adapted to accommodate a variety of inserts, thereby permitting variation in the geometry of said intake port;
 means for alternately raising or lowering said cylinder liner relative to said crankshaft, thereby varying the compression ratio of said engine; and
 means for maintaining a substantially constant valve timing relationship as said cylinder liner is raised or lowered.

6. A compression ignition engine, said engine having a crankcase, crankshaft, a counterbalance case and flywheel, a connecting rod and piston assembly, a cylinder liner, and a cam shaft, comprising:
 a holder for supporting said cylinder liner;
 a head assembly connected to said holder, said head assembly including valve means, wherein said head assembly has a bore therein adapted to receive a fuel injector nozzle to permit direct fuel injection, said bore being further adapted to receive a liner therein, said liner being adapted to shape a precombustion chamber and having a passgage therein adapted to receive an alternate fuel injector nozzle, said bore thereby being adapted to permit indirect fuel injection;
 means for alternately raising or lowering said cylinder liner relative to said crankshaft, thereby varying the compression ratio of said engine; and
 means for maintaining a sbustantially constant valve timing relationship as said cylinder liner is raised or lowered.

7. A compression ignition engine, as recited in clam 1, wherein said head assembly further comprises a removable fire deck positioned immediately above said cylinder liner.

8. A compression ignition engine, as recited in claim 1, wherein said head assembly has a passage therethrough adapted to permit insertion of a pressure transducer into said cylinder liner.

9. A compression ignition engine, said engine having a crankcase, crankshaft, a counterbalance case and flywheel, a connecting rod and piston assembly, a cylinder liner, and a cam shaft, comprising:
 a holder for supporting said cylinder liner, wherein said holder is adapted to permit water cooling of said cylinder liner;
 a head assembly connected to said holder, said head assembly including valve means;
 means for alternately raising or lowering said cylinder liner relative to said crankshaft, thereby varying the compression ratio of said engine; and
 means for maintaining a substantially constant valve timing relationship as said cylinder liner is raised or lowered.

10. A compression ignition engine, said engine having a crankcase, a crankshaft, a counterbalance case and flywheel, a connecting rod and piston assembly, a cylinder liner, and a cam shaft, comprising:
 a holder for supporting said cylinder liner, wherein said holder is adapted to permit heating of said cylinder liner;
 a head assembly connected to said holder, said head assembly including valve means;
 means for alternately raising or lowering said cylinder liner relative to said crankshaft, thereby varying the compression ratio of said engine; and
 means for maintaining a substantially constant valve timing relationship as said cylinder liner is raised or lowerd.

11. A compression ignition engine, said engine having a crankcase, crankshaft, a counterbalance case and flywheel, a connecting rod and piston assembly, a cylinder liner, and a cam shaft, comprising:
 a holder for supporting said cylinder liner;
 a head assembly connected to said holder, said head assembly including valve means; and
 means for alternately raising or lowering said cylinder liner relative to said crankshaft, thereby varying the compression ratio of said engine, wherein said means for alternately raising or lowering said cylinder liner comprises a threaded flange connected to said crankcase, a collar adapted for threaded engagement with said flange, a ring adapted to be received within a groove in said collar and a groove in said holder, and means for rotating said collar, whereby said head assembly, holder, and cylinder liner are urged upward or downward upon rotation of said collar.

* * * * *